United States Patent [19]
Adleff et al.

[11] Patent Number: 6,101,810
[45] Date of Patent: *Aug. 15, 2000

[54] HYDRODYNAMIC COUPLING HAVING CONSTANT QUANTITY OF WORKING FLUID AND VALVE FOR DISPLACING WORKING FLUID BETWEEN A WORKING SPACE AND A STORAGE SPACE

[75] Inventors: Kurt Adleff; Maik Tietz, both of Crailsheim; Gerd-Peter Hercher, Fichtenau-III, all of Germany

[73] Assignee: Voith Turbo GmbH & Co., Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,653

[22] Filed: Apr. 10, 1997

[30] Foreign Application Priority Data

Apr. 12, 1996 [DE] Germany .................... 196 14 589

[51] Int. Cl.⁷ .................... F16D 33/00; F16D 33/14
[52] U.S. Cl. .................... 60/337; 60/357; 60/351
[58] Field of Search .................... 60/330, 351, 357, 60/358, 359, 337, 352

[56] References Cited

U.S. PATENT DOCUMENTS

| | | | |
|---|---|---|---|
| Re. 29,928 | 3/1979 | Bopp | 60/330 |
| 1,859,607 | 5/1932 | Sinclair . | |
| 2,202,243 | 5/1940 | Alison | 60/337 |
| 2,831,323 | 4/1958 | Linsenmeyer | 60/337 |
| 3,045,430 | 7/1962 | Becker | 60/337 |
| 3,075,354 | 1/1963 | Sinclair . | |
| 3,157,999 | 11/1964 | Nelson . | |
| 3,405,524 | 10/1968 | Nelden | 60/337 |
| 3,751,923 | 8/1973 | Becker | 60/359 |
| 4,516,399 | 5/1985 | Holler et al. | 60/351 |
| 4,671,061 | 6/1987 | Elderton | 60/337 X |
| 4,970,860 | 11/1990 | Mezger et al. | 60/337 |
| 5,426,939 | 6/1995 | Cotttrll | 60/357 X |

FOREIGN PATENT DOCUMENTS

| | | |
|---|---|---|
| 0062274 | 10/1982 | European Pat. Off. . |
| 152257 | 8/1985 | European Pat. Off. . |
| 867030 | of 1953 | Germany . |
| 874712 | of 1953 | Germany . |
| 883377 | of 1953 | Germany . |
| 856541 | 3/1953 | Germany . |
| 1037779 | of 1954 | Germany . |
| 909272 | 4/1954 | Germany ............... 60/358 |
| 1194207 | 6/1965 | Germany . |
| 1425394 | 2/1969 | Germany . |
| 7024735 | 10/1970 | Germany . |
| 2035539 | of 1973 | Germany . |
| 2757252 | 6/1979 | Germany ............... 60/358 |
| 3047361 | of 1982 | Germany . |
| 3047361 | 7/1982 | Germany . |
| 4224728 | 2/1994 | Germany . |
| 747392 | of 1956 | United Kingdom . |
| 922415 | 4/1963 | United Kingdom . |
| 1000565 | 8/1965 | United Kingdom . |

OTHER PUBLICATIONS

Sonderdruck aus der Fachzeitschrift, "Olhydraulik und Pneumatik", Sonderdruck 3. Jg, 1959, Heft 3, 5, 6, 7.

Primary Examiner—John E. Ryznic
Attorney, Agent, or Firm—Ostrolenk, Faber, Gerb & Soffen, LLP

[57] ABSTRACT

A hydrodynamic coupling having a constant quantity of working fluid, the coupling comprising, a pump wheel and a turbine wheel which together form a working space for a working fluid, a first storage chamber in fluid communication with the working space; and a valve for displacing working fluid between the working space and the storage chamber in response to an external control during operation of the coupling; and further comprising a housing which is connected, fixed for rotation, with the pump wheel, the housing including the first storage chamber, the first storage chamber being rotatable with the housing.

25 Claims, 7 Drawing Sheets

RATED OPERATION: PARTIAL ADMISSION

Fig. 8

RATED OPERATION:

Fig.9 — EMPTYING

HYDRODYNAMIC COUPLING HAVING CONSTANT QUANTITY OF WORKING FLUID AND VALVE FOR DISPLACING WORKING FLUID BETWEEN A WORKING SPACE AND A STORAGE SPACE

BACKGROUND OF THE INVENTION

The present invention relates to a hydrodynamic coupling having a pump wheel and a turbine wheel which together form a toroidal working space for a hydraulic working fluid and further having a storage chamber for the hydraulic working fluid.

Couplings of this type have become known from a number of publications. The working space and storage chamber are in fluid communication with each other. Upon start-up of the drive motor driving the coupling, the storage chamber applies working fluid to the working space after a certain delay whereby the initial transmission of driving torque occurs very gently so that the components involved and particularly the drive motor are not overly stressed. Reference is made to the following documents:

(1) GB-A 922 415

(2) GB-A 1 000 565

(3) EP 062 274 A3

Hydrodynamic couplings using a constant quantity of working fluid (construction T) are generally used as starting and overload couplings.

In these known hydrodynamic or turbocouplings there is a dependence between the torque transmitted and the slippage which occurs between the pump wheel and turbine wheel. The torque which can be transmitted with a predetermined slippage is determined by the amount of working or coupling fluid introduced into the working space and the drive speed.

In these known couplings, a change in the coupling fluid admission into the working space during operation in order to change the torque/surface ratio at a constant drive speed is not possible. Furthermore, it is not possible to disconnect the output drive during operation.

In the known couplings, the starting torque can, for instance, be reduced by a delay chamber. The working space and delay chamber are in fluid communication with each other via nozzles. Depending on the dimensioning of the nozzles, working fluid passes faster or slower out of the delay chamber into the working space. In this way, the increase of the torque over time can be influenced.

This type of coupling offers the advantage of removing heat via the surface of the coupling since the fluid circuit enclosing parts rotate in air and can be optimized for cooling by suitable shaping.

In contrast to couplings with a constant quantity of working fluid, there are also couplings in which the working fluid is taken from an external container. In these couplings, the rotating coupling parts are surrounded by a stationary, oil-tight housing. In this way, the rate of admission of fluid into the coupling with constant drive speed can be varied and thus the torque-slippage ratio can be varied.

These applications are generally used for adjusting the speed of rotation of the output shaft. The heat produced is removed via an external cooling device.

SUMMARY OF THE INVENTION

An object of the invention is to provide a hydrodynamic coupling of the type having a constant quantity of working fluid that fulfills its functions excellently at low structural cost and having low manufacturing costs.

It is furthermore an object of the invention to provide a hydrodynamic coupling of the above type wherein the rate of admission of working fluid into the working space can be controlled rapidly and dependably, and wherein no external oil supply system is required.

Further, it is an object of the invention to provide a coupling wherein the transmittable torque of the coupling is capable of being varied as desired during operation.

The above and other objects are achieved by a hydrodynamic coupling having a constant quantity of working fluid, the coupling comprising a pump wheel and a turbine wheel which together form a working space for a working fluid, a first storage chamber in fluid communication with the working space and a valve for displacing working fluid between the working space and the storage chamber in response to an external control during operation of the coupling.

The above and other objects of the invention are also achieved by a method of operating an hydraulic coupling, the coupling comprising a pump wheel and a turbine wheel which together form a working space for a working fluid, a storage chamber in fluid communication with the working space and a valve for displacing working fluid between the working space and the storage chamber in response to an external control during operation of the coupling, the method comprising the steps of measuring the temperature of the working fluid by directly sensing the temperature of the working fluid; and when a given temperature of the working fluid is exceeded, reducing the volume of the working fluid in the working space and correspondingly increasing the volume of the working fluid in the storage chamber by displacing working fluid through the valve.

The above and other objects of the invention are furthermore achieved by a hydrodynamic coupling having a constant quantity of working fluid, the coupling comprising a pump wheel driven by a driving element and a turbine wheel coupled to a driven element, the pump wheel and the turbine wheel together cooperating to form a working space therebetween for a working fluid which is adapted to transfer a torque of the driving element from the pump wheel to the turbine wheel and thus to the driven element, a first storage chamber in fluid communication with the working space; and means for displacing working fluid between the working space and the storage chamber in response to an external control during operation of the coupling thereby to allow variation of the transfer of the torque from the driving element to the driven element during operation of the coupling.

The above and other objects of the invention are also achieved by a method of operating on hydraulic coupling, the coupling comprising a pump wheel driven by a driving element and a turbine wheel coupled to a driven element, the pump wheel and the turbine wheel together cooperating to form a working space therebetween for a working fluid which is adapted to transfer a torque of the driving element from the pump wheel to the turbine wheel and thus to the driven element, a first storage chamber in fluid communication with the working space; and means for displacing working fluid between the working space and the storage chamber in response to an external control during operation of the coupling thereby to allow variation of the transfer of the torque from the driving element to the driven element during operation of the coupling, the method comprising the steps of measuring the temperature of the working fluid by directly sensing the temperature of the working fluid; and when a given temperature of the working fluid is exceeded, reducing the volume of the working fluid in the working space and correspondingly increasing the volume of the working fluid in the storage chamber by operating said means for displacing to cause fluid to flow from the working space to the storage chamber.

Other features and advantages of the present invention will become apparent from the following description of the invention which refers to the accompanying drawings.

BRIEF DESCRIPTION OF THE DRAWINGS

The invention will now be described in greater detail with reference to the drawings in which:

FIG. 2A shows a detail of a portion of FIG. 1, viewed in the direction of arrows 2A—2A;

FIG. 2B shows a detail of a portion of FIG. 1 viewed in the direction of arrows 2B—2B;

DETAILED DESCRIPTION OF EMBODIMENTS OF THE INVENTION

Figure 1:
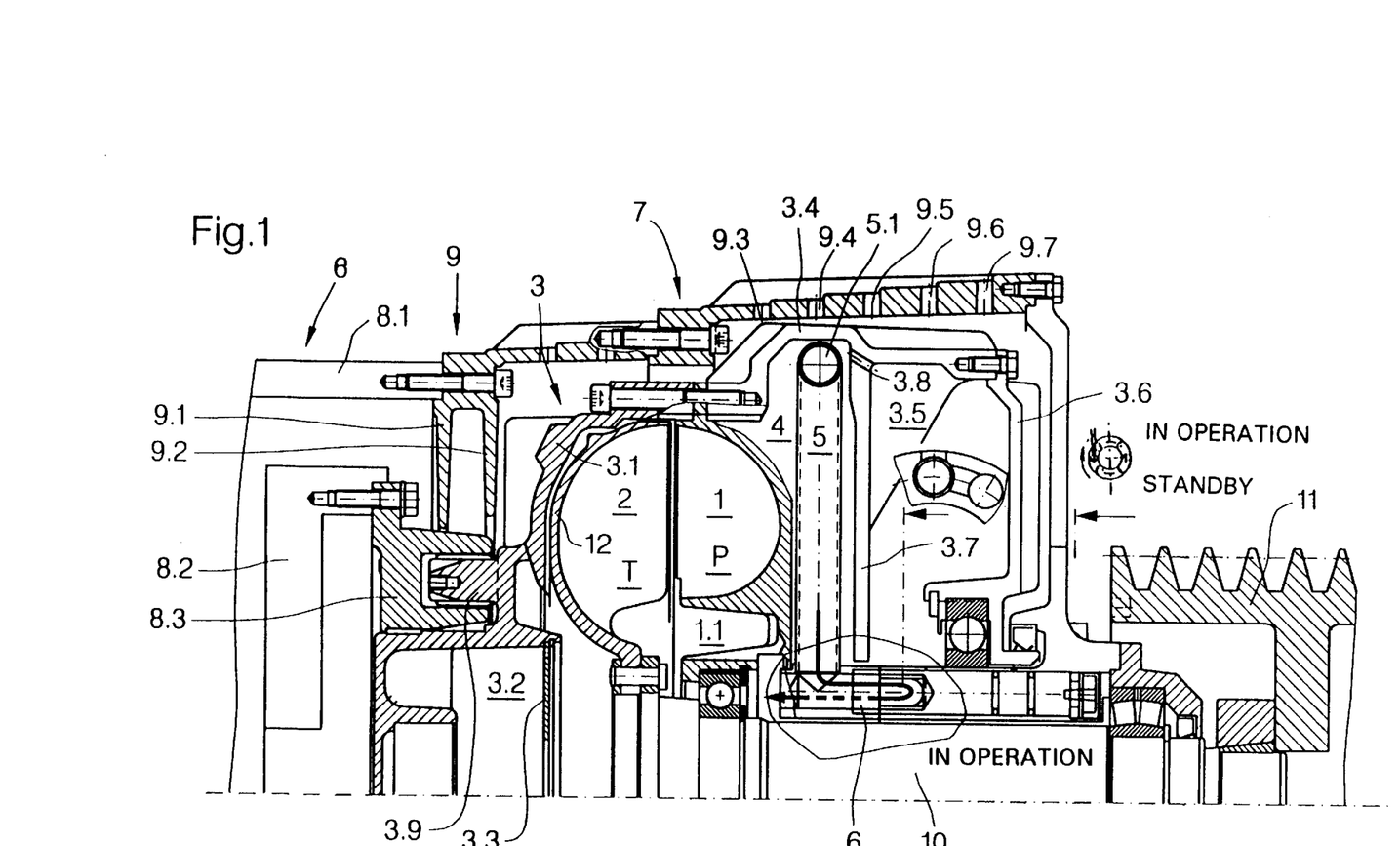
FIG. 1 is an axial half section through a hydrodymanic coupling showing the hydrodynamic coupling in operation.

With reference now to the drawings, FIG. 1 is an axial half cross-section through a hydrodynamic coupling in accordance with the invention. The longitudinal axis is indicated by the dot-dashed line at the bottom of FIG. 1. Accordingly, only half of the coupling is shown in FIG. 1. The same is true of the other cross sections of FIGS. 4–9.

A pump wheel 1 and a turbine wheel 2 together form a toroidal rotating working space 21. A trough-shaped wall 3.1 of an inner housing 3 surrounds a part of the turbine wheel 2. At the radially inner end of the wall part 3.1, a first impact-pressure space 3.2 is provided. It is separated from the turbine wheel 2 by an annular disk 3.3. The inner housing 3 furthermore has a wall part 3.4. The wall part 3.4 is bulged so that it has the shape of an annular trough 4 in which an impact pressure pump 5 is disposed. There is furthermore provided a fluid storage chamber or reservoir 3.5. It is formed from a further wall part 3.6 and a partition wall 3.7. On the radially outer end of the partition wall 3.7, a hole 3.8 is provided. The hole 3.8 allows fluid communication between the trough 4 and the storage chamber 3.5.

In the space 4 between the pump wheel 1 and the partition wall 3.7, a pump, such as an impact-pressure pump 5, which has the shape of a pipe socket, is provided. On its radially outer end, an inlet or mouthpiece 5.1 is provided. In the embodiment shown, the pipe socket 5 extends perpendicular to the axis of the machine. However it could also be inclined to the perpendicular.

Figure 2:
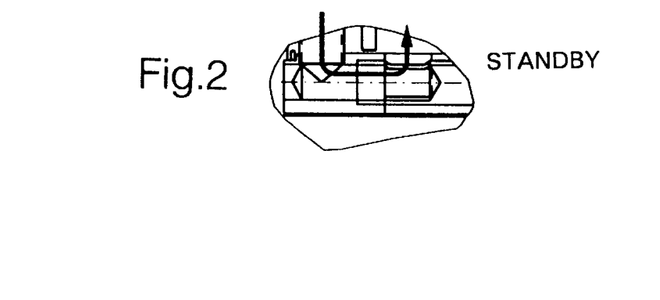
FIG. 2 shows a portion of the device of FIG. 1 wherein the coupling is placed in a standby mode.

The impact-pressure pump 5 is in fluid communication at its radially inner end with the working space 21 which is formed by the pump wheel 1 and the turbine wheel 2. This communication is shown by the heavy arrow 5.2. The fluid connection is determined by the position of a rotary valve 6. Of course, any other type of valve could also be used. The valve 6 has an operating position, shown in FIG. 1, wherein the coupling is in operation, and a standby mode, shown in FIG. 2. In FIG. 1, the valve is in the operating position and thus fluid flow is from the pump 5 into the working space 21. FIG. 2A show details of the rotary valve 6. The moving body 6A of valve 6 can be moved between the operating position in which fluid is directed to the working space 21 and a standby position, in which fluid is directed into storage space 3.5 via an opening 6E.

In FIG. 2, the valve 6 is positioned in the standby mode and fluid communication is provided between the impact-pressure pump 5 and the storage chamber 3.5. The heavy arrow 5.2 of FIG. 2 shows the course of the flow.

Figure 3:
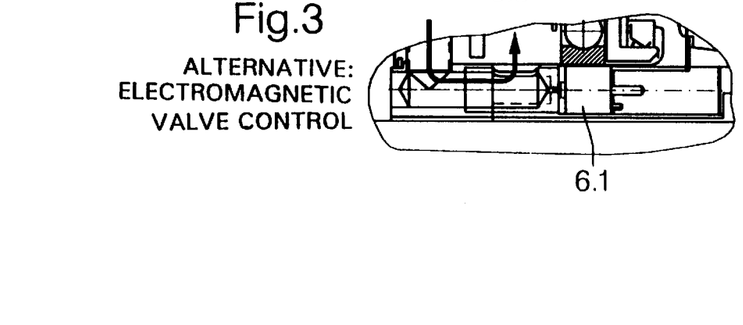
FIG. 3 shows a detail of an electromagnetic alternative valve control.

FIG. 3 shows an alternative embodiment of the valve 6 comprising a rotary magnet 6.1 which actuates the valve 6 by moving the valve body member 6A.

The housing 3 is surrounded by an outer housing 7. The entire hydrodynamic coupling is so structured that it can be connected to a drive motor 8. The housing of the drive motor is shown at 8.1. A flywheel 8.2 coupled to the drive motor shaft is coupled to a ring-shaped driver 8.3 by bolts. A plurality of driver claws 3.9 are formed on the wall part 3.1 and couple the coupling to the driver 8.3.

The outer housing 7 has a separate ventilation system. Between the motor 8 and the turbine wheel 2 an air inlet 9 is provided. The air inlet is formed by two annular disks 9.1 and 9.2 which form a ring-shaped, radial inlet channel. The inlet channel is connected by a plurality of holes (not shown) to the outer surroundings so that air can enter from the outside. The air flows around the radial inner edge of the annular disk 9.2, along the wall part 3 on which air conveyor vanes are formed, and then passes through holes 9.3 to 9.7 out of the outer housing 7. In this manner, intensive cooling of the inner parts of the hydrodynamic coupling is effected, by the passage of the cold air along the surface of the housing 3.

FIGS. 4 to 9 diagrammatically show axial half cross sections of embodiments of couplings in accordance with the invention and illustrate operation thereof.

Figure 4:
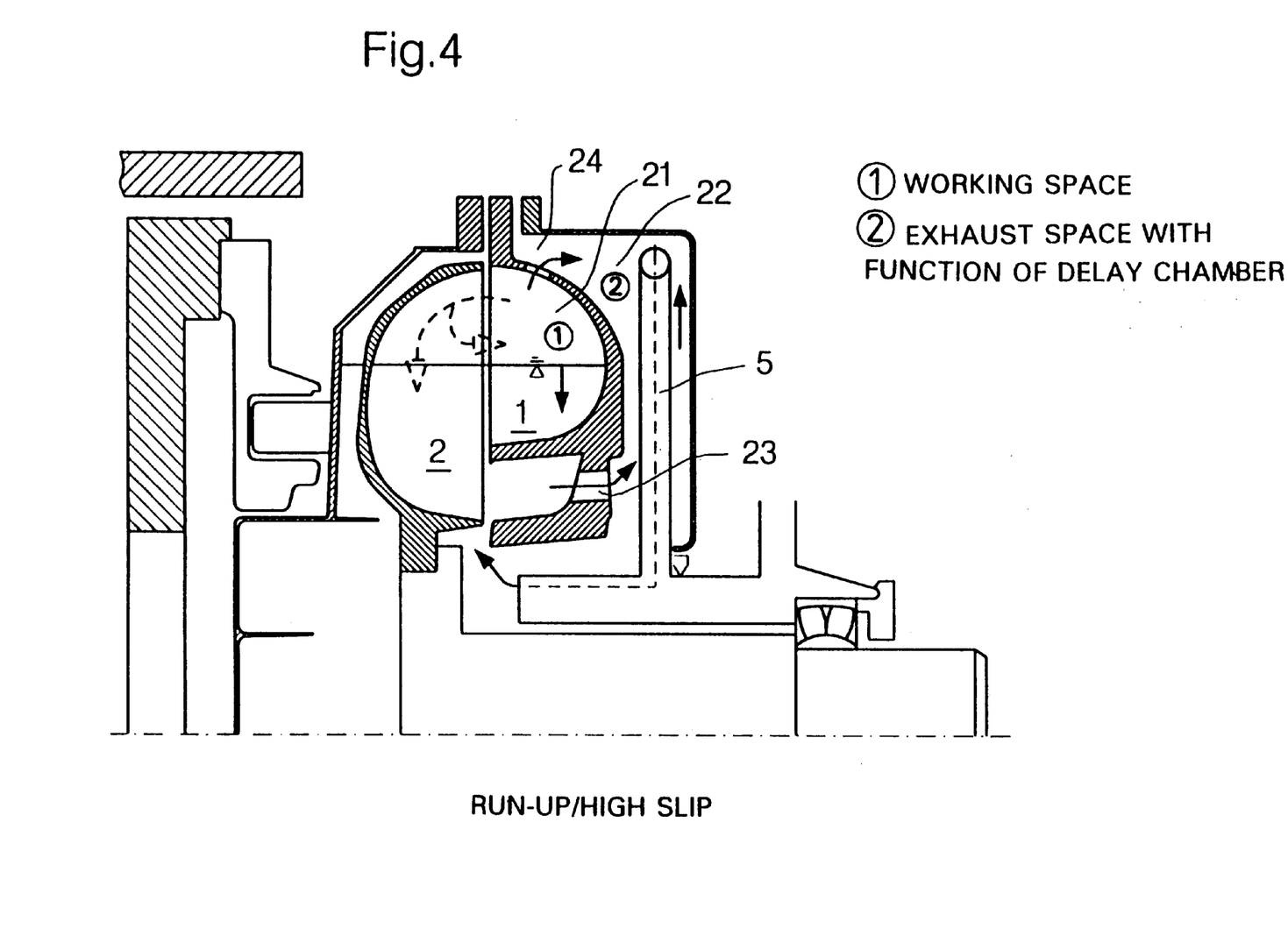
FIG. 4 is a simplified view of an embodiment of a hydrodynamic coupling in accordance with the invention illustrating operation at start-up with relatively high slippage.
Figure 5:
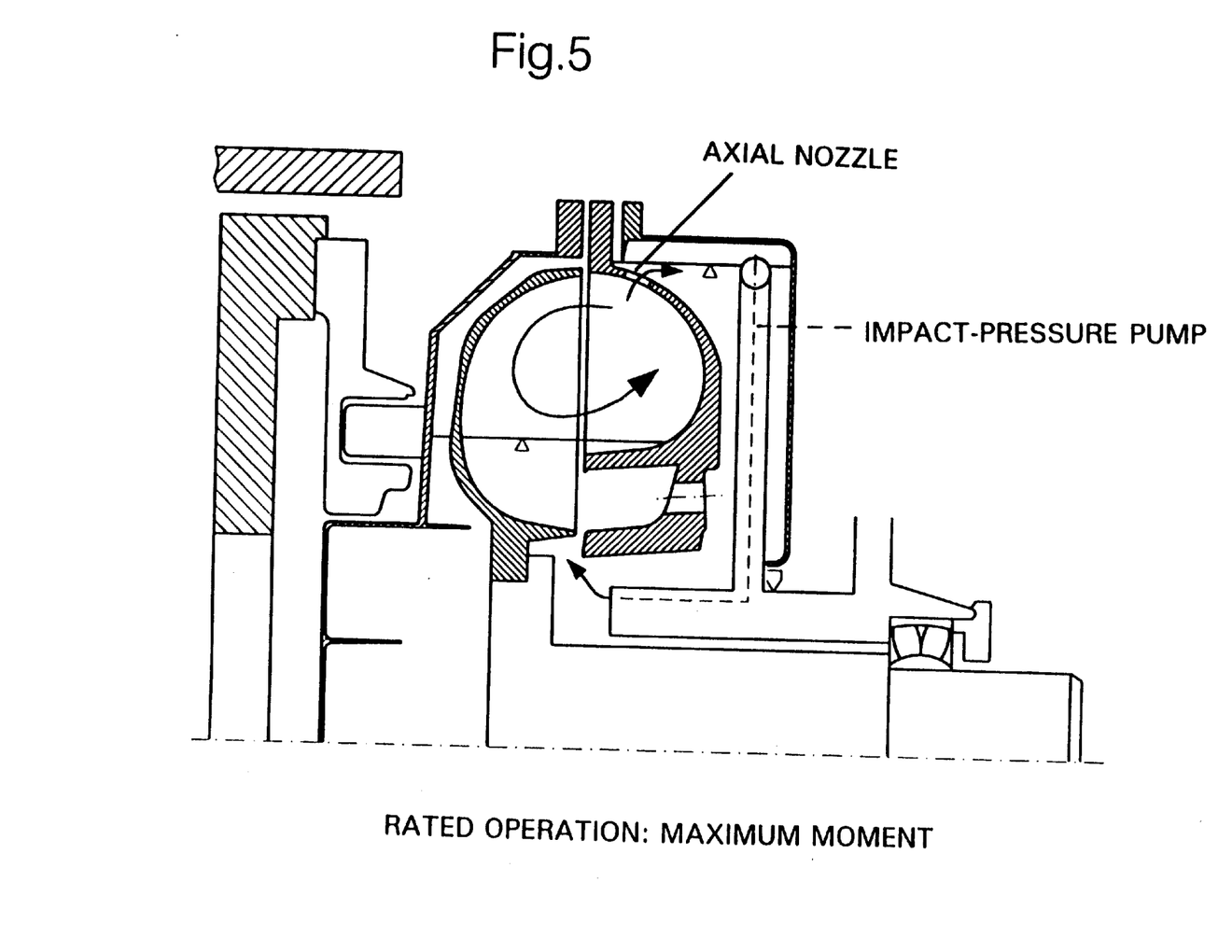
FIG. 5 shows the embodiment of FIG. 4 with the hydrodynamic coupling being operated at rated operation and providing maximum torque transfer.
Figure 6:
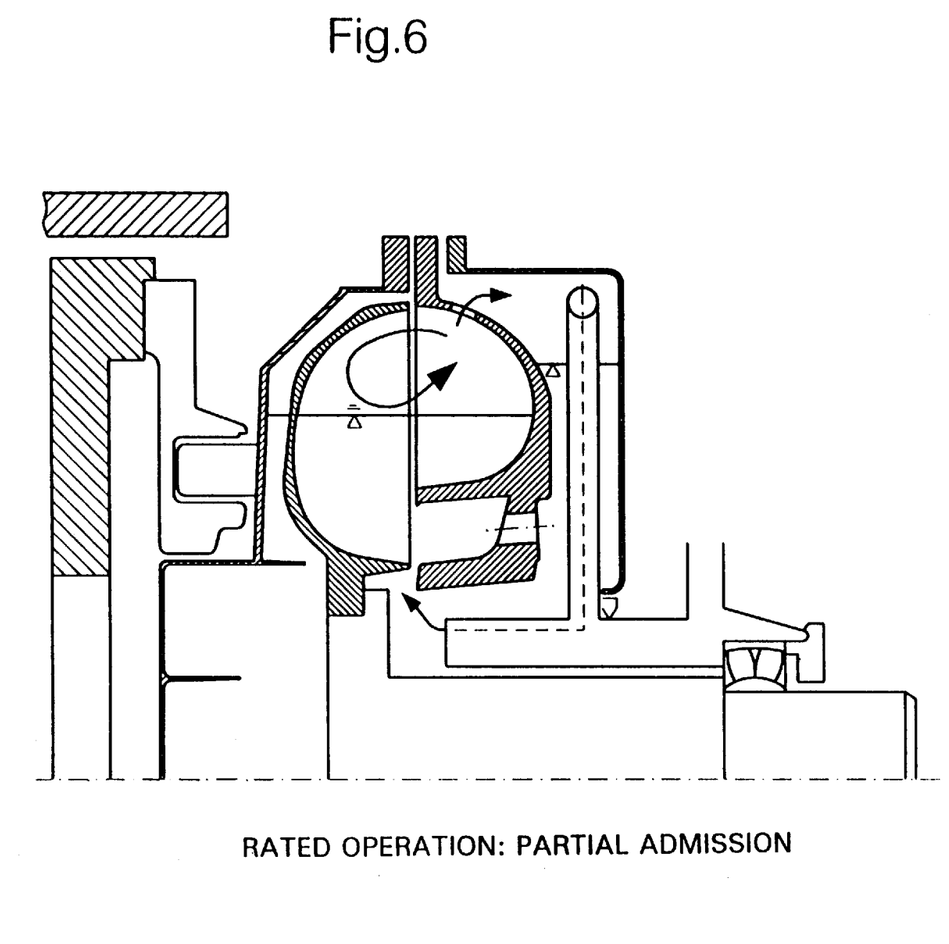
FIG. 6 shows the embodiment of FIGS. 4 and 5 showing the device at rated operation with partial admission of coupling fluid.

With reference to FIGS. 4 to 6, the essential parts of the coupling, namely, the pump wheel 1, the turbine wheel 2, the impact-pressure pump 5, the working space 21 and the pump space 22 forming a storage space are shown. The pump space 22 is so dimensioned that the admission of fluid into the working space 21 at start-up is greatly reduced. The hydraulic fluid present in the pump space 22 is removed by the impact-pressure pump 5 and fed radially inward by valve 6 (not shown) to the working space 21 as shown by arrow 5.2a. The pump wheel 1 has nozzle holes 23, 24 by which fluid communication between working space 21 and pump space 22 is produced. By the corresponding adaptation of the nozzle holes and by a corresponding adjustment of the valve 6 (not shown here), the variation with time of the increase in the torque up to full admission of fluid into the working space 21 can be established.

FIG. 4 shows the hydrodymanic coupling at start-up when there is relatively high slippage. The radially outward portion of pump space 22 (at the top of space 22 in the Figure) forms an exhaust space that functions as a delay chamber. The circular arrow A in working space 21 is shown as branched to indicate that there is slippage. The relative size of arrow A (compare FIG. 5) indicates that maximum torque is not being developed. The fluid levels in the pump pace 22 and working space 21 are as indicated by the horizontal lines with the triangle notation. Due to centrifugal force of rotation, the fluid is located at the most radially outward locations in the working space 21 and pump space 22. The arrows indicate direction of fluid flow. As shown in FIG. 4, fluid is directed by pump 5 into working space 21. Fluid leaves working space 21 through nozzles 23 and 24 back to pump space 22. During start-up, the fluid amount in pump space 22 is decreasing (arrow directed radially outward), while it is increasing in working space 21 (arrow directed radially inward).

FIG. 5, in contrast, shows the coupling of the invention at rated operation providing maximum developed torque. The larger size of arrow A1 indicates this. As shown, the fluid amount is at a minimum in pump space 22. FIG. 6 shows the coupling at rated operation but with only partial admission of hydraulic fluid into the working space. The developed torque is lower, as indicated by arrow A2.

Figure 7:
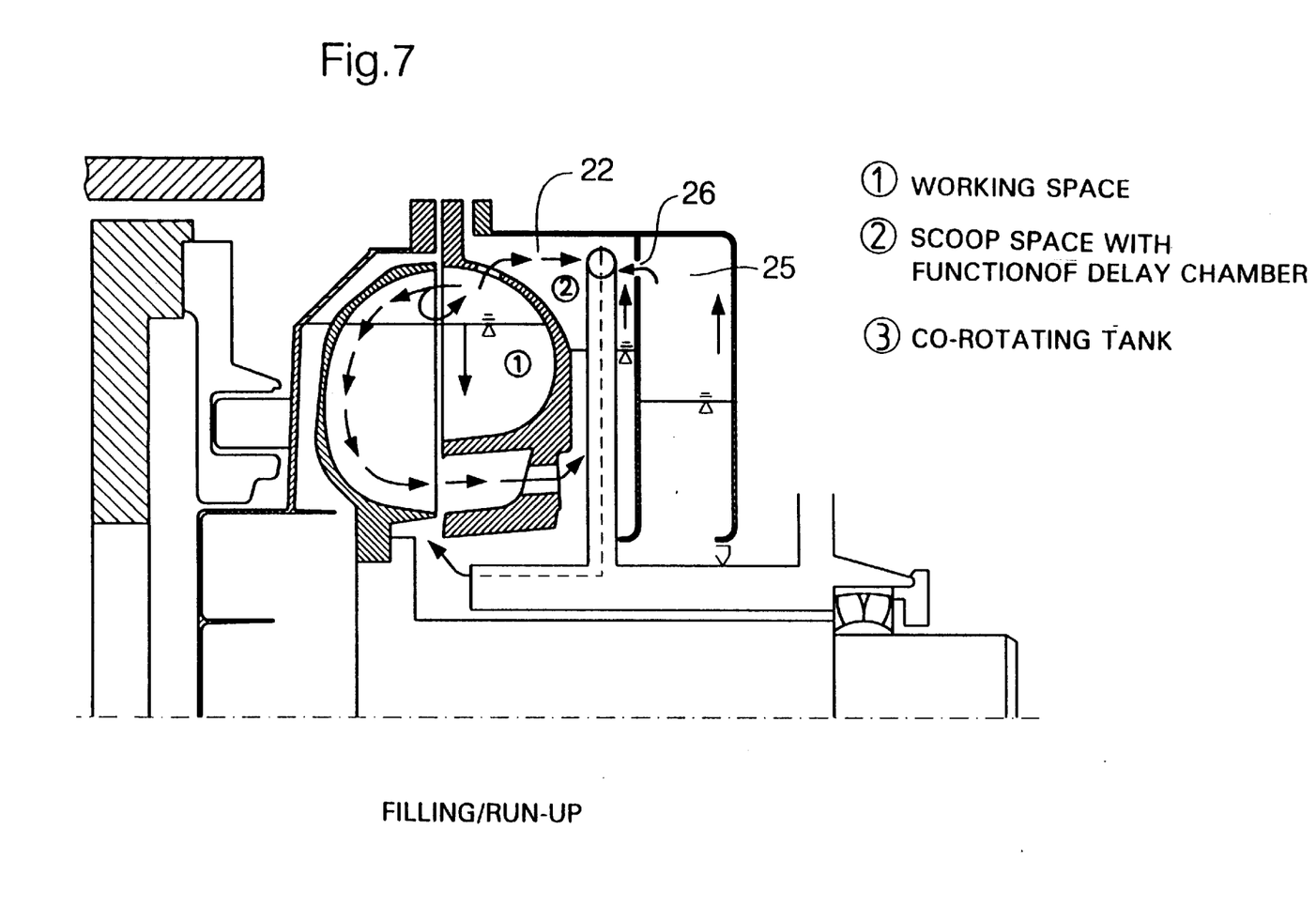
FIG. 7 shows a further embodiment of the invention wherein an additional fluid storage space is provided.
Figure 8:
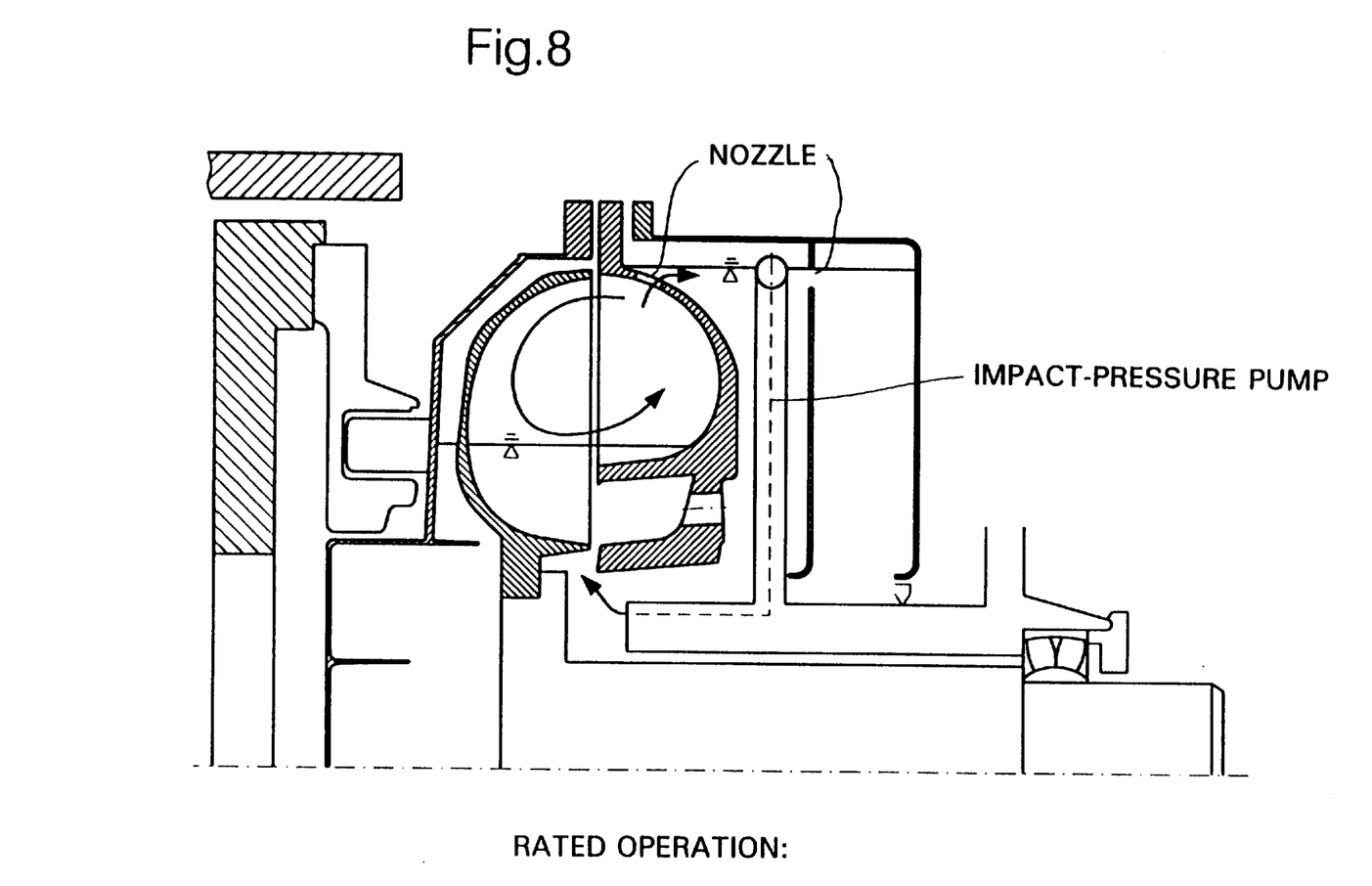
FIG. 8 shows the embodiment of FIG. 7 at rated operation.
Figure 9:
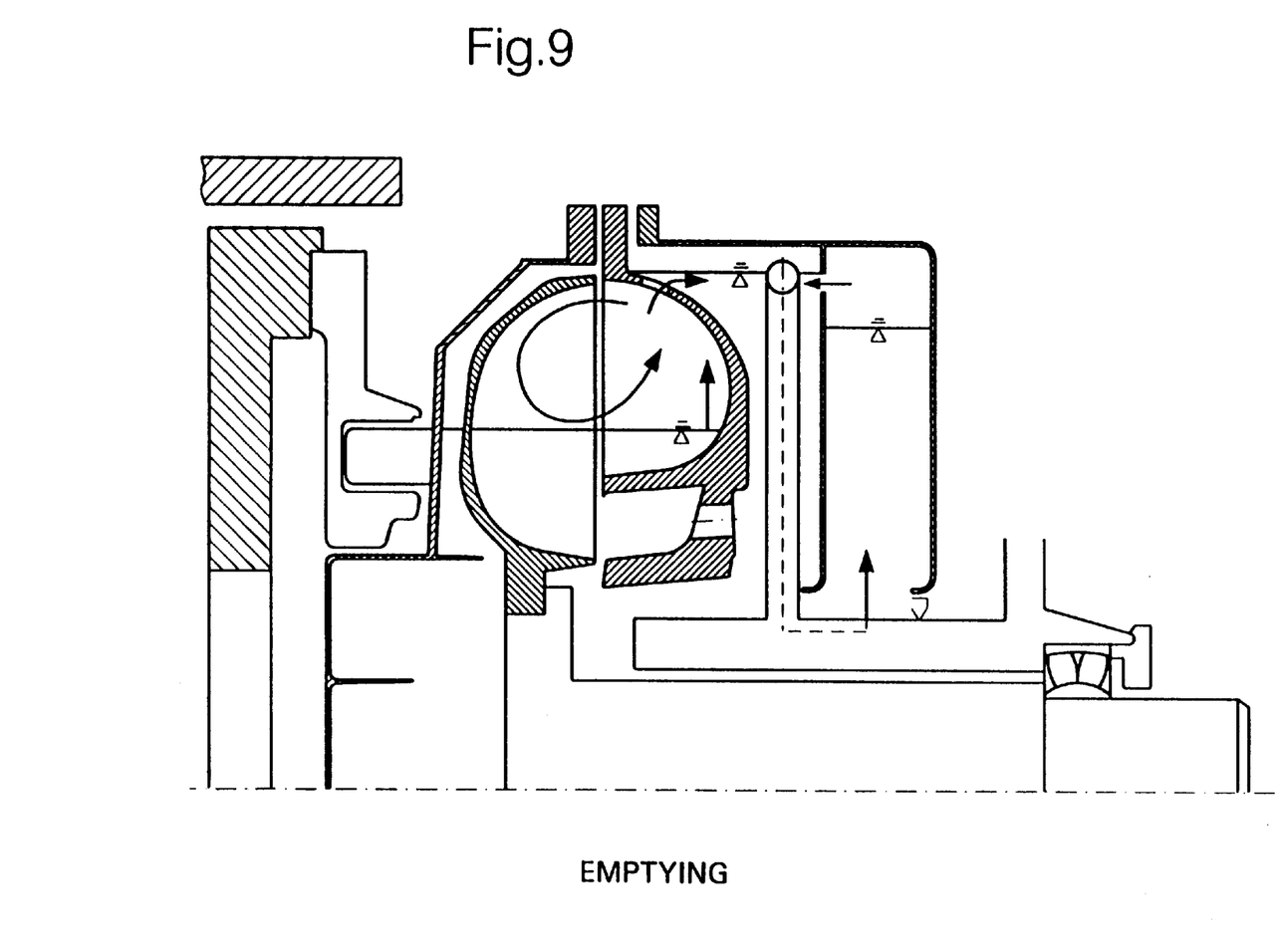
FIG. 9 shows the embodiment of FIGS. 7 and 8 in standby mode wherein the coupling fluid is being emptied from the working space of the coupling.

In the embodiment in accordance with FIGS. 7 to 9, an additional storage space 25 is provided (in addition to pump space 22). Space 25 is separated from the pump space 22 by a partition wall 3.7. Pump space 22 and additional storage space 25 are in fluid communication with each other via nozzle holes 26. As described below, the valve 6 (not shown) in the impact-pressure tube 6F can be connected functionally in such a manner that the hydraulic oil flows from the pump space 22 to the working space 21 or to the additional storage space 25.

FIG. 7 shows the coupling during start-up when the working space 21 is being filled by pump 5. The pump space 22 includes an exhaust or scoop space 22A at the radially outward portions providing a delay chamber function. The storage space 25 comprises a co-rotating tank rotating with the coupling. As shown in FIG. 7 by the branched circular arrows A3 in the working space 21, there is substantial slippage in the coupling during start-up.

In contrast, FIG. 8 shows the coupling during rated operation with maximum developed torque transfer. FIG. 9 shows the coupling during emptying of working space 21 into the storage space 25 while the coupling is disconnecting. Valve 6, as indicated by the flow of fluid shown by arrow 6C, has been placed in the stand-by mode and the coupling is in the process of disconnecting.

By suitable adjustment of the nozzle holes and of the valve 6 cross section, the transmittable torque of the coupling can be reduced down to the torque necessary to achieve merely air ventilation.

The invention may include the following additional features. The impact-pressure pump 5 is so designed that it offers low resistance to flow even with greater depth of immersion in coupling fluid. The impact-pressure pump 5 may be structured as a pipe with pipe elbows or as an annular disk with openings arranged tangentially at the outer perimeter. The impact-pressure pump 5 is also preferably provided with two openings which are 180° apart from each other, in order to obtain independence of the direction of rotation, i.e., clockwise or counter-clockwise. Further, the impact-pressure pump 6 is also preferably dimensioned so that, in unthrottled condition, in every stage of operation, the amount of hydraulic fluid provided by the different nozzles can be scooped out better from pump space 22.

The scoop (pump) space 22 and the storage space 25 preferably are ribbed for better removal of heat at the outer surface thereof. The working space 21, the scoop space 22 and the storage space 25 are communicating vessels when stationary. The position and size of the storage space 25 and scoop space 22 are so designed that the admission of working fluid during start-up into the working space 21 and thus the starting torque can be determined. By suitable means (WDR between scoop space 22 and storage space 25, radially upward directed impact-pressure pump 5, valve 6 tightly sealing-off from the working space 21 and scoop space 22, ball valves, closed upon standstill, in the radially outer nozzles between storage space 25 and scoop space 22), the start-up torque can be reduced to the level necessary to achieve air ventilation.

As an alternative to nozzles, the emptying of the working space 21 can be effected by an impact-pressure pump which can be switched by a valve. An emergency disconnect function can be implemented by rapid-emptying valves between the working space 21 and the pump space 22 (function "working space filled" =SEV closed effected by oil from the impact-pressure pump).

Bearing lubrication can be provided by the hydraulic fluid through holes in the line supplied by the impact-pressure pump 5. The valve 6 function can be on-off (black-white), proportional or timed. The type of valve may be slide, rotary slide, poppet, piston, valve flap, adjustable throttle or diaphragm, or any equivalent valve. The valve actuation can be by electrical, hydraulic, pneumatic, manual, or any desired means or combination of these means.

Temperature monitoring can also be provided. Dynamic refilling of the scoop space 22 and/or the storage space 25 upon high slippage through suitable holes may also be provided. The coupling of the invention provides infinitely variable adjustment of the speed of the driven shaft by change in the valve cross section.

The coupling may also be connected to an external heat exchanger.

In the radially inner region of the pump wheel 1 an additional impact-pressure space 1.1 can be provided (FIG. 1) which also serves to delay fluid admission and thus to reduce stresses upon start-up.

The flow of power in the coupling is as follows:

Motor 8 drives the flywheel 8.2. Flywheel 8.2 moves the driver 8.3 bolted thereto. Torque is transmitted to the driver claws 3.9 and thus to the pump wheel 1 via outer housing 3. From the pump wheel 1, the transmission of torque takes place hydrodynamically through the fluid to the turbine wheel 2 and from there to a shaft 10 bolted to the turbine wheel 2. A V-belt pulley 11, for example, may be provided on driven shaft 10 to operate equipment.

The hydrodynamic coupling in accordance with the invention operates completely independently, i.e. without any external oil supply system. The reception volume of the storage chamber 3.5, 25 is dimensioned in accordance with the volume of the working space 21.

The valve 6 can be switched as desired externally, i.e., into the two positions which are shown in FIGS. 1 and 2, in order to produce fluid communication between the impact-pressure pump 5 and either the working space 21 or the storage chamber 3.5, 25. FIG. 1 shows the operational mode wherein fluid is provided to working space 21. FIG. 2 shows the standby mode in which fluid is shunted to storage space 3.5. The valve 6, however, can also be set in intermediate positions so that different operating behaviors can be brought about in very finely differentiated fashion. FIG. 2A shows how the operational and standby modes are achieved. When the valve 6 body is moved to the left, the standby mode is selected. When the valve 6 body is moved to the right the operational mode is selected. FIG. 2B shows a cross section at section 2B—2B of the coupling. The valve 6 can be externally moved between the two positions "operational" and "stand-by" by movement of the lever 6D which rotates the valve body 6A between the two positions.

Impact-pressure space 3.2 is in fluid communication with the working space 21 via an annular slot 12 between the turbine wheel 2 and the wall part 3.1. Since this is the only fluid communication path between the impact-pressure space 3.2 and the working space 21, a very strongly delayed cooling of the working space after stopping occurs via the annular slot 12.

In the case of closed hydrodynamic couplings with constant admission of fluid, it is known to take measures so that excess temperatures of the working fluid cannot occur, and thus to prevent damage to the coupling. In general, meltable fuse screws are used for this. The solder melts at a given temperature, whereby the working fluid is released from the working space 21.

In known couplings, the temperature of the working fluid itself is not measured but rather the temperature of the surrounding air in the region of the rotating parts of the coupling is measured. A given value of the air temperature is used as a disconnect signal. This method has the disadvantage of a high inaccuracy of measurement as well as great inertia. Furthermore, this method generally requires that the drive motor be turned off in order to take advantage of it.

In accordance with the invention, the temperature of the working fluid itself is measured. Generally, as is known, this is a hydraulic oil. This means that a temperature sensor 30 is placed in the stream of oil.

Furthermore, in accordance with the invention, when the sensor detects that a given temperature of the working fluid is exceeded, working fluid is removed from the working space 21 and transferred into the storage chamber 3.5, 25. As described with reference to the embodiment of FIGS. 7–9, the valve 6 would be operated to direct hydraulic oil from the pump space or scoop space 22 either to the working space 21 or to the additional storage space 25, for example dependent upon temperatures sensed. The control device 31 which receives the signal from the sensor 30 operates the valve 6. It is thus not necessary to disconnect the drive motor. This has the great advantage that secondary driven shafts which are installed on the motor drive continue to operate unaffected.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A hydrodynamic coupling having a constant quantity of working fluid, the coupling comprising:
   a pump wheel and a turbine wheel which together form a working space for a working fluid;
   a first storage chamber in fluid communication with the working space; and
   a valve for displacing working fluid between the working space and the storage chamber in response to an external control during operation of the coupling;
   a housing which is connected, fixed for rotation, with the pump wheel, the housing surrounds the turbine wheel, the housing including the first storage chamber, the first storage chamber being disposed axially adjacent the pump wheel and being rotatable with the housing;
   a hydraulic pump provided in the first storage chamber, the pump having an inlet for working fluid at a radially outer end, and a radially inner end of the pump being in fluid communication with the working space.

2. The coupling of claim 1, wherein:
   a slot is provided in the housing for air cooling of the coupling; and
   the hydraulic pump comprises an impact-pressure pump driven by a driving element driving the coupling.

3. The coupling of claim 2, wherein the impact-pressure pump comprises a pipe-like member.

4. The coupling of claim 1, wherein the housing is surrounded by an outer housing.

5. The coupling of claim 4, wherein the outer housing has air inlets and air outlets for cooling the coupling in a region surrounding the turbine wheel.

6. The coupling of claim 1, wherein a second storage chamber formed in the housing is provided axially alongside the first storage chamber.

7. A hydrodynamic coupling having a constant quantity of working fluid, the coupling comprising:
   a pump wheel and a turbine wheel which together form a working space for a working fluid;
   a first storage chamber in fluid communication with the working space; and
   a valve for displacing working fluid between the working space and the storage chamber in response to an external control during operation of the coupling and further wherein a housing is provided, fixed for rotation, with the pump wheel, a wall of the housing being bulged outwardly in a region forming a ring-shaped trough for working fluid.

8. The coupling of claim 7, wherein the trough is disposed at a greater radius than a radially outermost point of the working space.

9. The coupling of claim 8, wherein the housing is surrounded by an outer housing.

10. The coupling of claim 8, wherein a second storage chamber formed in the housing is provided axially alongside the first storage chamber.

11. The coupling of claim 7, wherein the housing is surrounded by an outer housing.

12. The coupling of claim 7, wherein a second storage chamber formed in the housing is provided axially alongside the first storage chamber.

13. A method of operating a hydraulic coupling, the coupling comprising:
   a pump wheel and a turbine wheel which together form a working space for a working fluid;
   a storage chamber in fluid communication with the working space; and
   a valve for displacing working fluid between the working space and the storage chamber in response to an external control during operation of the coupling;
   the method comprising the steps of:
      measuring the temperature of the working fluid by directly sensing the temperature of the working fluid; and
      when a given temperature of the working fluid is exceeded, reducing the volume of the working fluid in the working space and correspondingly increasing the volume of the working fluid in the storage chamber by operating the valve to displace fluid from the working space to the storage chamber during operation of the coupling to cool the working fluid.

14. The method of claim 13, further comprising the step of controlling the position of the valve displacing fluid between the working space and the storage chamber.

15. The method of claim 14, wherein the valve is controllable between two positions, an operational position wherein the coupling is in an operational mode and a stand-by position wherein the coupling disconnects a driver element from a driven element.

16. The method of claim 15, wherein the valve is controllable to at least one position between said operational position and said stand-by position.

17. The method of claim 13, further comprising controlling the valve by at least one of an electrical, hydraulic and pneumatic mechanism or a combination thereof.

18. A hydrodynamic coupling having a constant quantity of working fluid, the coupling comprising:
   a pump wheel driven by a driving element and a turbine wheel coupled to a driven element, the pump wheel and the turbine wheel together cooperating to form a working space therebetween for a working fluid which is adapted to transfer a torque of the driving element from the pump wheel to the turbine wheel and thus to the driven element;
   a first storage chamber in fluid communication with the working space; and
   means for displacing working fluid between the working space and the storage chamber in response to an external control during operation of the coupling thereby to allow variation of the transfer of the torque from the driving element to the driven element during operation of the coupling;
   a housing which is connected and fixed for rotation with the pump wheel, the housing includes a first storage chamber, wherein the first storage chamber is rotatable, the valve has an operational position wherein working fluid is directed from the pump to the working space and a standby position wherein working fluid is directed into the storage chamber, the scoop is disposed in a pump space adjacent the working space and in fluid communication with the working space.

19. The coupling of claim 18, wherein the working space is in fluid communication with the pump space through at least one nozzle.

20. The coupling of claim 18, wherein the pump space is in fluid communication with the storage chamber through a port.

21. A method of operating an hydraulic coupling, the coupling comprising:
   a pump wheel driven by a driving element and a turbine wheel coupled to a driven element, the pump wheel and the turbine wheel together cooperating to form a working space therebetween for a working fluid which is adapted to transfer a torque of the driving element from the pump wheel to the turbine wheel and thus to the driven element;
   a first storage chamber in fluid communication with the working space; and
   means for displacing working fluid between the working space and the storage chamber in response to an external control during operation of the coupling thereby to allow variation of the transfer of the torque from the driving element to the driven element during operation of the coupling;
   the method comprising the steps of:
      measuring the temperature of the working fluid by directly sensing the temperature of the working fluid; and
      when a given temperature of the working fluid is exceeded, reducing the volume of the working fluid in the working space and correspondingly increasing the volume of the working fluid in the storage chamber by operating said means for displacing to cause fluid to flow from the working space to the storage chamber during operation of the coupling thereby cooling the working fluid.

22. The method of claim 21, wherein the means for displacing comprises a controllable valve, and further comprising the step of controlling the position of the valve displacing fluid between the working space and the storage chamber.

23. The method of claim 22, wherein the valve is controllable between two positions, an operational position wherein the coupling is in an operational mode and a stand-by position wherein the coupling disconnects the driven element from the driving element.

24. The method of claim 23, wherein the valve is controllable to at least one position between said operational position and said stand-by position.

25. The method of claim 22, further comprising controlling the valve by at least one of an electrical, hydraulic and pneumatic mechanism or a combination thereof.

* * * * *